(12) United States Patent
Chang et al.

(10) Patent No.: US 9,986,396 B2
(45) Date of Patent: *May 29, 2018

(54) METHOD AND APPARATUS FOR PROVIDING INFORMATION ABOUT A CALL RECIPIENT AT A USER DEVICE

(71) Applicant: Samsung Electronics Co., Ltd., Gyeonggi-do (KR)

(72) Inventors: Ilku Chang, Gyeonggi-do (KR); Youngho Rhee, Gyeonggi-do (KR); Youngshil Jang, Gyeonggi-do (KR); Youngkyu Jin, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/612,579

(22) Filed: Jun. 2, 2017

(65) Prior Publication Data

US 2017/0272922 A1 Sep. 21, 2017

Related U.S. Application Data

(63) Continuation of application No. 13/624,412, filed on Sep. 21, 2012.

(30) Foreign Application Priority Data

Sep. 21, 2011 (KR) .......................... 10-2011-0095146

(51) Int. Cl.
*H04M 3/24* (2006.01)
*H04W 4/16* (2009.01)
(Continued)

(52) U.S. Cl.
CPC .............. *H04W 4/16* (2013.01); *G06Q 10/10* (2013.01); *H04L 67/24* (2013.01);
(Continued)

(58) Field of Classification Search
CPC ............. H04W 8/245; H04M 1/72525; H04M 1/72519; H04M 1/72583; H04M 1/6066;
(Continued)

(56) References Cited

U.S. PATENT DOCUMENTS

2003/0149527 A1  8/2003  Sikila
2005/0088980 A1* 4/2005  Olkkonen ............. H04W 48/16
                                              370/255

(Continued)

FOREIGN PATENT DOCUMENTS

EP    2 192 756       6/2010
JP    2007-081498     3/2007
(Continued)

OTHER PUBLICATIONS

European Search Report dated Sep. 1, 2015 issued in counterpart application No. 12833665.8-1870, 6 pages.
(Continued)

*Primary Examiner* — Dai A Phuong
(74) *Attorney, Agent, or Firm* — The Farrell Law Firm, P.C.

(57) ABSTRACT

A method and apparatus are to provide status information about a call recipient and information about other users located in a same area as the call recipient. A method for providing information about the call recipient by a user device includes initiating a call transmission to the call recipient; receiving forwarding information corresponding to the call transmission; and outputting information about the call recipient and information about users located in a same area as the call recipient, based on the forwarding information.

17 Claims, 10 Drawing Sheets

(51) Int. Cl.
*H04L 29/08* (2006.01)
*G06Q 10/10* (2012.01)
*H04M 3/54* (2006.01)
*H04W 4/04* (2009.01)
*H04M 3/42* (2006.01)

(52) U.S. Cl.
CPC ....... *H04M 3/42102* (2013.01); *H04M 3/541* (2013.01); *H04M 3/42348* (2013.01); *H04M 2203/2044* (2013.01); *H04M 2203/2094* (2013.01); *H04W 4/046* (2013.01)

(58) Field of Classification Search
CPC ............. H04M 1/6041; H04M 1/6091; H04M 1/6075; B60R 11/0241; H04B 1/3877
USPC .... 455/412.1–414.3, 415–416, 456.1–456.3, 455/457, 466, 519
See application file for complete search history.

(56) References Cited

U.S. PATENT DOCUMENTS

| | | | |
|---|---|---|---|
| 2005/0114881 A1 | 5/2005 | Philyaw | |
| 2006/0073839 A1 | 4/2006 | Gorday et al. | |
| 2007/0123325 A1 | 5/2007 | Kim | |
| 2008/0114881 A1 | 5/2008 | Lee et al. | |
| 2008/0114884 A1* | 5/2008 | Hewes | H04L 29/06 709/229 |
| 2008/0132255 A1 | 6/2008 | Benco et al. | |
| 2009/0005024 A1* | 1/2009 | Kato | H04M 1/006 455/417 |
| 2009/0148827 A1 | 6/2009 | Argott | |
| 2010/0216442 A1 | 8/2010 | Kim | |
| 2010/0268051 A1 | 10/2010 | Prasad | |
| 2010/0302022 A1* | 12/2010 | Saban | B60N 2/002 340/459 |
| 2011/0021234 A1* | 1/2011 | Tibbitts | H04W 48/04 455/517 |
| 2011/0105097 A1 | 5/2011 | Tadayon et al. | |
| 2011/0151892 A1* | 6/2011 | Vengroff | H04W 4/02 455/456.3 |
| 2011/0186374 A1* | 8/2011 | McCoy | B60R 21/00 180/268 |
| 2011/0219856 A1 | 9/2011 | Tonmukayakul | |
| 2012/0040719 A1 | 2/2012 | Lee | |
| 2012/0134482 A1* | 5/2012 | Moore | H04M 3/53391 379/88.22 |
| 2012/0214463 A1* | 8/2012 | Smith | H04M 1/72577 455/418 |
| 2012/0214471 A1 | 8/2012 | Tadayon | |
| 2012/0214472 A1* | 8/2012 | Tadayon | H04B 5/0062 455/418 |
| 2013/0035063 A1* | 2/2013 | Fisk | H04M 1/72572 455/410 |
| 2014/0351027 A1* | 11/2014 | Gravelle | H04Q 9/00 705/13 |
| 2016/0127533 A1 | 5/2016 | Lee | |

FOREIGN PATENT DOCUMENTS

| | | |
|---|---|---|
| JP | 2009-010850 | 1/2009 |
| KR | 1020050074765 | 7/2005 |
| KR | 1020100093760 | 8/2010 |

OTHER PUBLICATIONS

Korean Office Action dated Mar. 2, 2018 issued in counterpart application No. 10-2011-0095146, 7 pages.

* cited by examiner

METHOD AND APPARATUS FOR PROVIDING INFORMATION ABOUT A CALL RECIPIENT AT A USER DEVICE

PRIORITY

This application is a continuation application of U.S. patent application Ser. No. 13/624,412, which was filed on Sep. 21, 2012, and claims priority under 35 U.S.C. § 119(a) to Korean Patent Application Serial No. 10-2011-0095146, which was filed in the Korean Intellectual Property Office on Sep. 21, 2011, the entire disclosure of which is hereby incorporated by reference.

BACKGROUND OF THE INVENTION

1. Field of the Invention

The present invention relates generally to a method and apparatus for providing information about a call recipient, and more particularly, to a method and apparatus for providing status information about a call recipient and information about other users located in a same area as the call recipient that fails to receive a call.

2. Description of the Related Art

Talking on a telephone while driving is generally considered to be dangerous, especially when not using a hands free device such as a Bluetooth® headset or speakerphone system. Accordingly, many drivers refrain from answering any incoming calls while driving.

Further, from the point of view of a call sender, there is no way to check the status of a call recipient, especially, to check whether a call recipient is driving. Therefore, the call sender may repeatedly call the call recipient, which is inconvenient and bothersome to both parties.

BRIEF SUMMARY OF THE INVENTION

The present invention has been designed to address the above-mentioned problems and/or disadvantages and to offer at least the advantages described below.

Accordingly, an aspect of the present invention is to provide a method and apparatus for setting information about a call recipient in the call recipient's user device, which will be used to provide status information about the call recipient driving a vehicle and information about fellow passengers in the vehicle.

Another aspect of the present invention is to provide a method and apparatus for providing status information about a call recipient to a call sender's user device.

Another aspect of the present invention is to provide a method and apparatus for a user device of a call recipient in a vehicle to interact with a vehicle management system of the vehicle and to transmit status information about the call recipient and device information about fellow passengers to a call sender.

According to an aspect of the present invention, a method for providing information about a call recipient by a calling user device is provided. The method includes initiating a call transmission to the call recipient; receiving forwarding information corresponding to the call transmission; and outputting information about the call recipient and information about users located in a same area as the call recipient, based on the forwarding information.

According to another aspect of the present invention, a method for providing, by a call recipient user device, information about a call recipient and users existing in a same area as the call recipient is provided. The method includes receiving a call transmission request from a call sender; acquiring forwarding information including device information about users existing in a same area as the call recipient and status information related to the device information; generating a call response message based on the forwarding information; and transmitting the call response message to the call sender.

According to another aspect of the present invention, a method for providing information about a call recipient at a user device is provided. The method includes transmitting a call in response to user's selection; acquiring forwarding information when a call response for a safety mode is received in response to the call transmission; based on the forwarding information, constructing a user interface using the forwarding information; and outputting the information about the call recipient and the information about the users located in the same area as the call recipient through the user interface.

According to another aspect of the present invention, a method for providing information about a call recipient at a user device is provided. The method includes at a transmitting device, transmitting a call connection message to a receiving device; at the receiving device, acquiring forwarding information from a vehicle management system in a safety mode; at the receiving device, creating a call response message based on the forwarding information and then transmitting the call response message to the transmitting device; at the transmitting device, receiving the call response message and then, based on the forwarding information in the call response message, outputting information about the call recipient of the receiving device; and at the transmitting device, performing a call transmission to a selected user device in response to a call switch request.

According to another aspect of the present invention, a system for providing information about a call recipient is provided. The system includes a transmitting device that transmits a call request; a called device that receives the call request from the transmitting device and transmits forwarding information to the transmitting device in response to the call request; a fellow device that is located in a same area as the called device; and a vehicle management system that generates the forwarding information based on device information about the called device and the fellow device, and generates status information for the device information. The transmitting device receives the forwarding information from the called device, and displays a user interface based on the forwarding information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method and apparatus are described for providing status information about a call recipient in a vehicle and information about a fellow passenger in the vehicle. By providing this information to a call sender, the call sender will know not to continually call the call recipient. As a result, safer driving conditions are provided for the call recipient, and the call sender is immediately provided with useful information.

Accordingly, even though the call recipient will not receive a call, the call sender may simply call the fellow passenger. Namely, the call sender will quickly know the current status of the call recipient and fellow passengers and can safely communicate with the fellow passenger while the original call recipient is driving.

Figure 1:
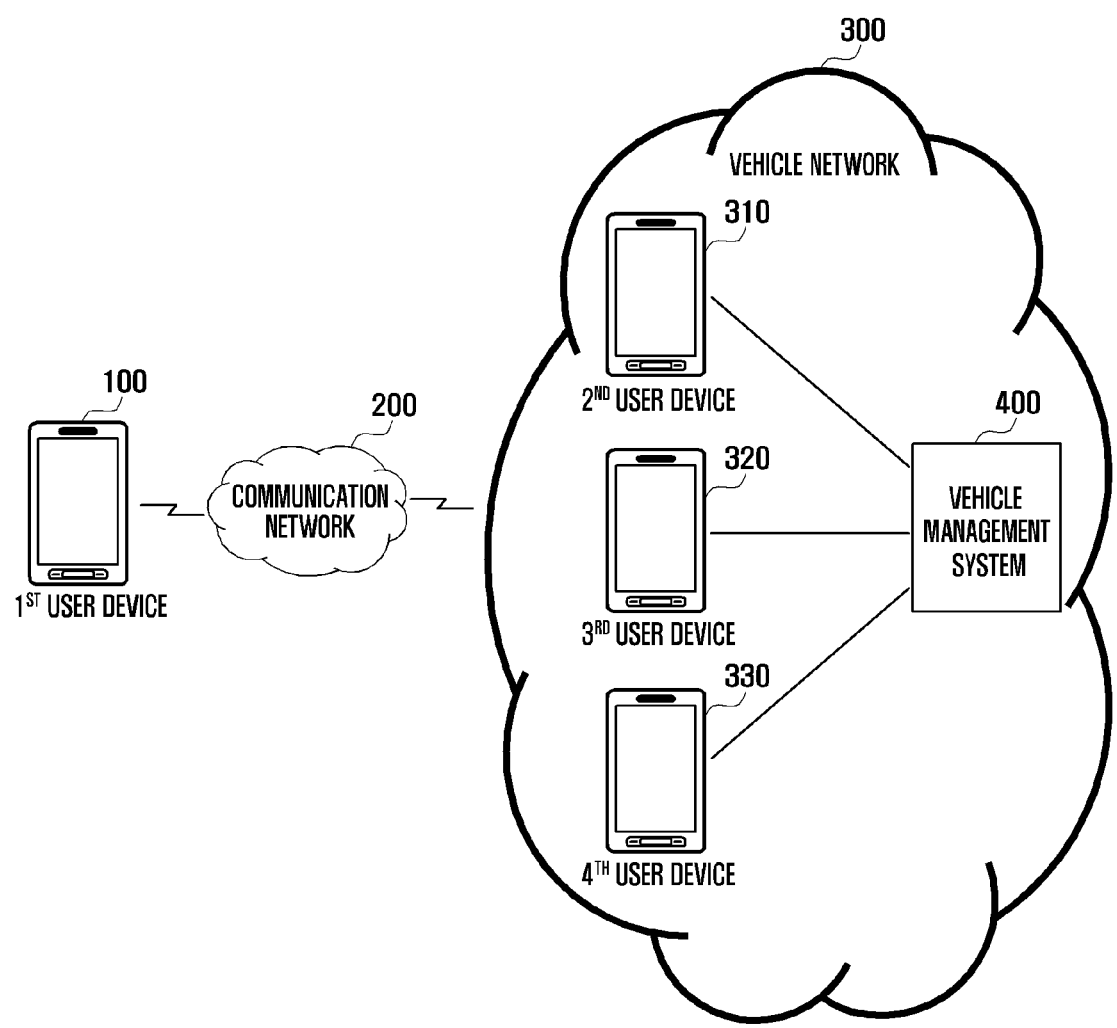
FIG. 1 illustrates a call service providing system in accordance with an embodiment of the present invention.

FIG. 1 illustrates a call service providing system in accordance with an embodiment of the present invention.

Referring to FIG. 1, the call service providing system includes a first user device 100, a communication network 200, and a vehicle network 300, which includes a group of second, third, and fourth user devices 310, 320, and 330 and a vehicle management system 400. The second, third, and fourth user devices 310, 320, and 330 are included in the vehicle network 300 because their respective users are located in a vehicle corresponding to the vehicle network 300. Specifically, the first user device 100 is a call sender user device and the second user device is a call recipient user device. The third and fourth user devices 320 and 330 are user devices of fellow passengers in the vehicle with the call recipient.

The vehicle management system 400 collects and manages device information about the second, third, and fourth user devices 310, 320, and 330 located in the vehicle network 300, and the communication network 200 supports a communication service (e.g., a call service) between the first, second, third, and fourth user devices 100, 310, 320, and 330.

The first user device 100 generates a call connection message and transmits the call connection message to the second user device 310 through the communication network 200. Assuming that the call recipient is driving the vehicle and does not want to answer the call, in accordance with an embodiment of the present invention, the first user device 100 receives a call response message, as a reply to the call connection message, from the second user device 310. The call response message includes forwarding information, i.e., status information about the call recipient and information about the third and fourth user devices 320 and 330 of the fellow passengers. When receiving the call response message, the first user device 100 constructs a user interface based on the forwarding information included in the call response message. Such user interfaces will be described in more detail herein below.

After receiving the status information about the call recipient, i.e., an indication that the call recipient is driving, the first user device 100 may either manually stop the call transmitting process after receiving a user input or may be set to automatically stop upon receipt of status information about a call recipient indicating that the call recipient is driving.

Additionally, using the information about the third and fourth user devices 320 and 330 of the fellow passengers, the call sender may input a request for a call switch, whereby the first user device 100 generates a new call connection message to one of the third and fourth user devices 320 and 330 of the fellow passengers, in response to the call switch request. The first user device 100 then sends the new call connection message to the appropriate user device, e.g., depending on the recipient information of the user device selected through a user interface.

In this call switch, if a previous call transmitting process is maintained, the first user device 100 may stop the previous call transmitting process and instead perform a new call transmitting process based on the call switch.

When entering the vehicle network 300, each of the second, third, and fourth user devices 310, 320, and 330 detects the vehicle management system 400 and performs an authentication process with the vehicle management system 400. When successfully connected to the vehicle management system 400, the second, third, and fourth user devices 310, 320, and 330 provide their own device information to the vehicle management system 400. For example, the device information may include a user name, a device identifier (e.g., Caller IDentification (CID)), a user image, etc., from each user device.

In accordance with an embodiment of the present invention, when entering the vehicle, at least one of the second, third, and fourth user devices 310, 320, and 330 provides driving-related status information (e.g., indicating whether the status is a driver or a fellow passenger) with device information. For example, the driver, i.e., the call recipient, designates the status information of the second user device 310 as a driver through a direct manipulation. Alternatively, a user may designate the status information of each of second, third, and fourth user devices registered in the vehicle management system 400, using a user interface offered by the vehicle management system 400.

Further, any one of the second, third, and fourth user devices 310, 320, and 330 located in the vehicle network 300 may receive a call connection message from a transmitting device (e.g., the first user device 100), obtain forwarding information from the vehicle management system 400, and provide the forwarding information to the first user device 100. For example, the forwarding information may include device information about user devices located in the vehicle network 300, and current status information about each user device. Additionally, the status information may be mapped with the device information.

In order to obtain forwarding information, a user device receiving a call connection message sends a request for the forwarding information to the vehicle management system 400. After receiving the forwarding information from the vehicle management system 400, the user device then creates a call response message using the received forwarding information and sends the call response message to the first user device 100 through the communication network 200.

Additionally, the vehicle management system 400 may collect, register, and manage device information about second, third, and fourth user devices 310, 320, and 330 that enter the vehicle network 300. Particularly, when the second, third, and fourth user devices' 310, 320 and 330 entrance into the vehicle network 300 is detected, the vehicle management system 400 performs a authentication process with each of the second, third, and fourth user devices 310, 320, and 330 and then connects with them. Also, the vehicle management system 400 may receive device information from each of the second, third, and fourth user devices 310, 320, and 330 connected thereto, and perform a mapping with status information about each of the second, third, and fourth user device 310, 320, or 330.

Further, the vehicle management system 400 may receive a request for forwarding information from any user device (e.g., the second user device 310) located in the vehicle network 300. Thereafter, the vehicle management system 400 retrieves forwarding information about the second, third, and fourth user devices 310, 320, and 330 located in the vehicle network 300 from forwarding information registered therein, and sends the retrieved information to the requesting user device (e.g., the second user device 310). At this time, the vehicle management system 400 may insert device information and status information about each user device into the forwarding information.

The vehicle management system 400 may send and receive signals to and from the second, third, and fourth user devices 310, 320, and 330 in the vehicle network 300 using any suitable type of wireless communication. For example, the second, third, and fourth user devices 310, 320, and 330 and the vehicle management system 400 may support wireless communication through Radio Frequency ID (RFID), Bluetooth®, Near Field Communication (NFC), Infrared Data Association (IrDA), ZigBee, Wi-Fi, etc.

Additionally, the user devices described herein may include any type of electronic devices, multimedia players, and their application equipment, which support a call service through a mobile or Internet communication based on the communication network 200, and communicate with the vehicle management system 400. For example, the user devices may include mobile communication devices based on various communication protocols, smart phones, tablet Personal Computers (PCs), Portable Multimedia Players (PMPs), media players, portable game consoles, Personal Digital Assistants (PDAs), laptop computers, etc.

Figure 2:
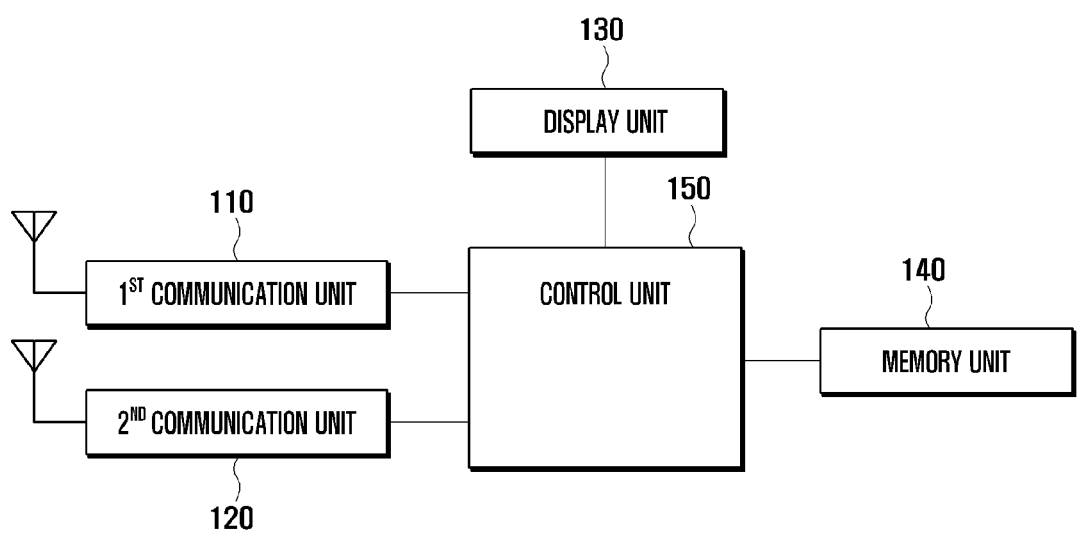
FIG. 2 is a block diagram illustrating a user device in accordance with an embodiment of the present invention.

FIG. 2 is a block diagram illustrating a user device in accordance with an embodiment of the present invention.

Referring to FIG. 2, the user device includes a first communication unit 110, a second communication unit 120, a display unit 130, a memory unit 140, and a control unit 150. This user device may essentially or selectively include any other elements, which will be not illustrated nor described in this disclosure. For instance, the user device may further include an audio processing unit having a microphone and a speaker, a digital broadcast module for receiving digital broadcast such as DMB (Digital Multimedia Broadcasting) or DVB (Digital Video Broadcasting), a digital camera module, an input unit for supporting a mechanical key input, a touch pad for supporting a touch-based input, a battery for power supply, and so forth.

The first communication unit 110 supports a wireless connection and communication with the vehicle management system 400. Also, under the control of the control unit 150, the first communication unit 110 may retrieve a wireless access point (AP) (e.g., the vehicle management system 400) and send or receive signals for authentication to or from the vehicle management system 400. When the user device 100 is connected to the vehicle management system 400, the first communication unit 110 sends device information stored in the memory unit 140 to the vehicle management system 400, and receives forwarding information from the vehicle management system 400. The first communication unit 110 may include at least one of wireless communication modules such as a Bluetooth® module, an IrDA module, an RFID module, a ZigBee module, a Wi-Fi module, etc.

The second communication unit 120 supports wireless communication connections with other user devices through the communication network 200. The second communication unit 120 may include an RF module for supporting a voice communication, a video communication, a data communication, etc., based on a mobile communication. Also, the second communication unit 120 may support an Internet communication service based on Internet Protocol (IP). The second communication unit 120 sends a call connection message to and receives a call response message from another user device through the communication network 200.

Although not illustrated in FIG. 2, the user device 100 may use a single communication module that simultaneously supports wireless communication between user devices and with the vehicle management system 400. Namely, the first and second communication units 110 and 120 are not limited to two dedicated communication modules or specific communication techniques, but may be realized in one or various other communication modules.

The display unit 130 visually represents a variety of screens for operation of the user device. For example, the display unit 130 displays a home screen of the user device and execution screens in connection with the execution of various applications. Particularly, the display unit 130 displays a screen for a call transmitting process, a screen for reception of a call response message, etc. In such cases, the display unit 130 displays a user interface screen that shows user regions based on forwarding information included in a call response message, and also shows status information about users in each user region, which will be described in more detail below.

Although the display unit 130 may include an Liquid Crystal Display (LCD), a Light Emitting Diode (LED), an Organic LED (OLED), or an Active Matrix OLED (AMO-LED). Additionally, the display unit 130 may include an interface supporting touch-based inputs. For example, using a touch screen, the display unit 130 may support touch-based user inputs and send corresponding input signals to the control unit 150. Further, depending on rotation or direction of the user device 100, the display unit 130 may support a screen display in a landscape mode, a screen display in a portrait mode, and an adaptive screen switch display between both modes.

The memory unit 140 stores a variety of applications and data executed and processed in the user device and may be formed using one or more memories or storage media. For example, the memory unit 140 may include a Read Only Memory (ROM), a flash memory, a Random Access Memory (RAM), a Hard Disk Drive (HDD), or any external hard disk drive or storage medium. The memory unit 140 may store an Operating System (OS) of the user device, programs and data related to a call transmitting process (e.g., creation and transmission of a call connection message), programs and data related to configuring a user interface when receiving a call response message, programs and data related to a call switch, programs and data related to a data control and connection with the vehicle management system 400 when entering the vehicle network 300, programs and data related to a display control of the display unit 130, and programs and data related to an input control using the display unit 130.

Also, the memory unit 140 may store information (e.g., phonebook information, device information, status information, forwarding information, setting information, etc.) related to a call function. For example, setting information includes information about activation and inactivation of a safety mode in the vehicle network 300, information about manual and automatic transmission schemes of a call response message in the safety mode activated, and information about whether a previous call transmission will be maintained or automatically stopped upon receipt of the call response message.

The control unit 150 controls the entire operation of the user device, and therefore, controls processes related to call transmitting and receiving functions.

Specifically, in connection with the call transmitting functions, the control unit 150 generates a call connection message, and controls transmission of the call connection message to a user device of the call recipient. When receiving a call response message, as a reply to the call connection message, from the user device of the call recipient, the control unit 150 generates a user interface based on forwarding information (e.g., status information about the call recipient and device information about the fellow passengers) included in the call response message. When receiving the call response message, the control unit 150 may also stop a call transmitting process according to a user selection or a predefined setting. Additionally, in response to a request for a call switch, the control unit 150 controls a call transmitting process based on recipient information selected for the call switch.

Further, the control unit 150 detects the vehicle management system 400 and performs an authentication process with the vehicle management system 400 when the user device enters the vehicle network 300. When successfully connected to the vehicle management system 400, the control unit 150 provides device information stored in the memory unit 140 to the vehicle management system 400. Further, when receiving a call connection message from a transmitting device in the vehicle network 300, the control unit 150 may obtain forwarding information (i.e., device information and status information) from the vehicle management system 400. After receiving the forwarding information from the vehicle management system 400, the control unit 150 generates a call response message based on the received forwarding information and sends the call response message to a user device of the call sender.

Figure 3:
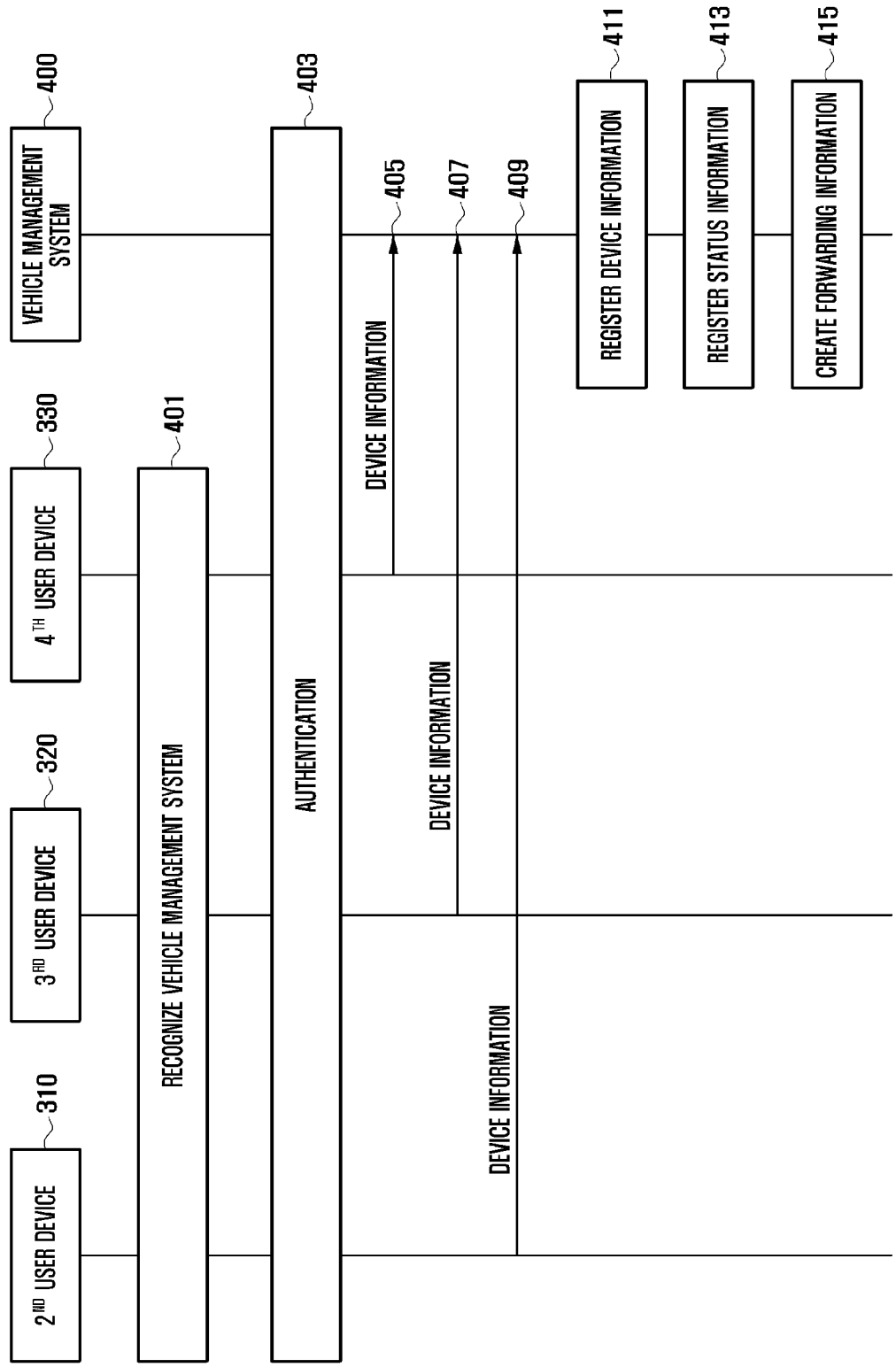
FIG. 3 is a signal flow diagram illustrating a user device registration procedure in a vehicle management system in a call service providing system in accordance with an embodiment of the present invention.

FIG. 3 is a signal flow diagram illustrating user device registration procedure in a vehicle management system in a call service providing system in accordance with an embodiment of the present invention.

Referring to FIG. 3, in step 401, the second, third, and fourth user devices 310, 320, and 330 recognize the vehicle management system 400, when entering into the vehicle network 300. For example, the vehicle management system 400 may be equipped in a vehicle and be in a state of performing a function as access point (AP). Users of the user devices 310, 320 and 330 may be in the same vehicle. Each of the second, third, and fourth user devices 310, 320, and 330 receives wireless signals broadcasted from the vehicle management system 400 through a search function, such as an AP search, and recognizes the vehicle management system 400.

After recognizing the vehicle management system 400, each of the second, third, and fourth user devices 310, 320, and 330 transmits data for a connection with the vehicle management system 400. For example, this recognition process may be performed manually, i.e., when getting into the vehicle, users control the second, third, and fourth user devices 310, 320, and 330 to invoke a function for a connection with the vehicle management system 400. A driver may select and send in advance information for notifying others that he or she is a driver.

In step 403, after receiving the data for the connections with the second, third, and fourth user devices 310, 320, and 330, the vehicle management system 400 performs an authentication process for the second, third, and fourth user devices 310, 320, and 330. For example, the authentication between the vehicle management system 400 and the second, third, and fourth user devices 310, 320, and 330 may be made according to a predefined protocol such as the Wi-Fi standard.

After successful authentication, the second, third, and fourth user devices 310, 320, and 330 transmit their own device information to the vehicle management system 400 in steps 405, 407, and 409, respectively. For example, the device information may include a user name, a device identifier, a user image, a phone number, and status information indicating whether the user of the user device is a driver. The transmission of device information may be made manually through a user manipulation, e.g., the user may select a status (i.e., driver or fellow passenger) through a user interface provided in the user device.

In step 411, the vehicle management system 400 registers. In step 413, the vehicle management system 400 registers status information of each user by mapping the status information to the device information. For example, in order to register the status information of each user with the device information, the vehicle management system 400 may detect signal strength of the second, third, and fourth user devices 310, 320, and 330, and may determine the user device having the highest signal strength as a driver. Therefore, the vehicle management system 400 may register status information by mapping status information indicating a driver to device information of the user device determined as a driver and also by mapping status information indicating fellow passengers to device information of the other user devices. Alternatively, the vehicle management system 400 may register status information of each user based on status information received from the second, third, and fourth user devices 310, 320, and 330.

In step 415, the vehicle management system 400 creates and manages forwarding information about the second, third, and fourth user devices 310, 320, and 330, i.e., status information about the call recipient and information about the third and fourth user devices 320 and 330 of the fellow passengers.

Figure 4:
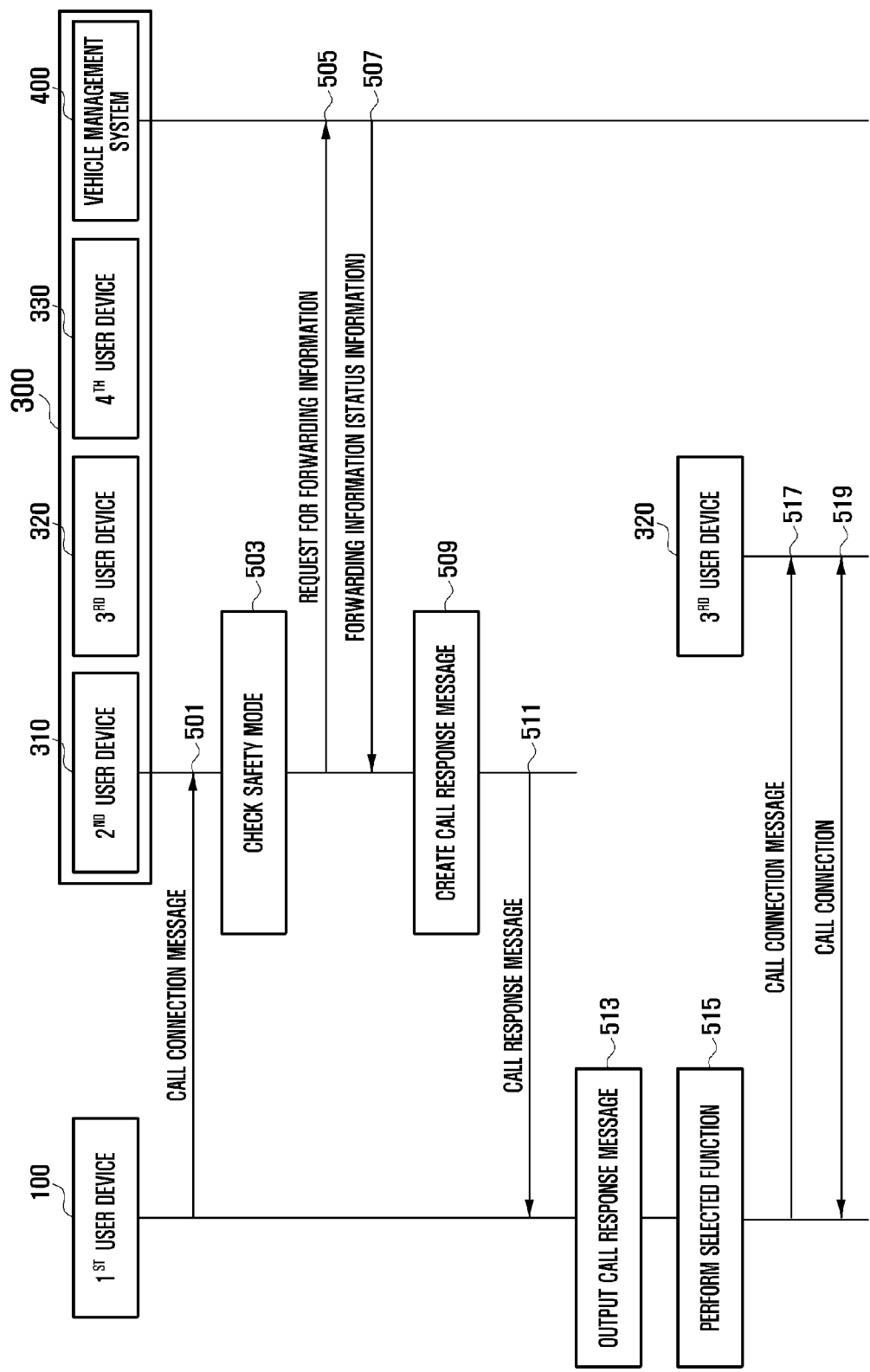
FIG. 4 is a signal flow diagram illustrating a call procedure in accordance with an embodiment of the present invention.

FIG. 4 is a signal flow diagram illustrating a call procedure in accordance with an embodiment of the present invention. Particularly, in FIG. 4, the first user device 100 corresponds to a transmitting device, and the second user device 310 among the second, third and fourth user device 310, 320 and 330 located in the vehicle network 300 is a receiving device that receives a call from the first user device 100.

Referring to FIG. 4, the first user device 100 generates a call connection message and transmits the call connection message to the second user device 310 in step 501. For example, the user of the first user device 100 selects the user of the second user device 310 from a contact list, and executes a call transmission. Then, in response to execution of the call transmission, the first user device 100 may create a call connection message that requests a call connection with a target user device (e.g., the second user device 310), and send the call connection message on the basis of recipient information.

In step 503, after receiving the call connection message from the first user device 100, the second user device 310 checks whether a safety mode is set. Herein, the safety mode refers to a mode set by the user when getting into a vehicle, during which the user does not want to receive calls. For example, according as a user getting into a vehicle connects his or her user device with the vehicle management system 400, the safety mode may be established on purpose to forward a received call to fellow passenger for safe driving or on purpose to offer information about fellow passengers in the same space to the transmitting device for privacy.

In the safety mode, the second user device 310 requests the vehicle management system 400 to provide forwarding information in step 505. Herein, forwarding information includes device information about all user devices connected with the vehicle management system 400 in the vehicle network 300, and status information related to the device information, which indicates whether a user of the device is a driver or a passenger. Although not illustrated, the second user device 310 may selectively ignore received call information (e.g., vibration, audio output, lamp output, etc.) in the safety mode.

In step 507, the vehicle management system transmits the forwarding information to the second user device 310. Here, forwarding information may include device information about all currently managed user devices 310, 320 and 330 connected with the vehicle management system 400 in the vehicle network 300. The vehicle management system 400 may also transmit status information, indicating whether each user is a driver or not, through the forwarding information by mapping the status information to device information about each user device.

In step 509, the second user device 310 generates a call response message using the received forwarding information. For example, the second user device 310 may insert an identifier into a header field and insert the forwarding information into a data field. The identifier indicates that the call response message is not for the call connection but for call forwarding in the safety mode.

Although not illustrated, the second user device 310 may omit some of the device information included in the forwarding information from the call response message for users to which a user of the first user device has no relationship, e.g., is not friends with. For example, based on predetermined relation information, the second user device 310 may identify device information about users having specific relations. The relation information refers to information that identifies friend relations, acquaintance relations, colleague relations, etc., and may be defined from relations formed through a Social Network Service (SNS) or registered in a contact list.

In step 511, the second user device 310 transmits the call response message to the first user device 100. Here, the second user device 310 may maintain or selectively stop a call connection routine requested from the first user device 100. For example, although not illustrated, the second user device 310 may automatically or manually stop a call connection routine being performed by a call transmission from the first user device 100 when sending a call response message according to the execution of a safety mode, not a call response message for a call connection.

In step 513, the first user device 100 outputs a screen related to the received call response message. For example, the first user device 100 checks a header field of the call response message, and if the header field includes identification information for a call connection, the first user device 100 may perform a call connection with the second user device 310 in response to the call response message. However, if the header field includes identification information for call forwarding, the first user device 100 extracts the forwarding information included in a data field of the call response message. Based on the extracted forwarding information, the first user device 100 generates a user interface and control related screen output. More detailed examples of such user interfaces will be discussed later with reference to FIGS. 5-8.

Further, when receiving the call response message for call forwarding, the first user device 100 may automatically or manually (i.e., by user's selection) stop a call transmission that has been already performed. If a call connection routine is stopped by the second user device 310, as discussed above, the first user device 100 may omit a step of stopping the call transmission.

In step 515, the first user device 100 performs a specific function requested by the user. For example, by using a user interface in the first user device 100, the user recognizes that the user of the second user device 310 is driving and that there are fellow passengers. Thereafter, the user of the first user device 100 may select one of the fellow passenger through the user interface in order to request a call transmission to the third or fourth user device 320 or 330 of the selected passenger, using a call switch.

In step 517, the first user device 100 generates a call connection message for a call connection with, e.g., the third user device 320, as illustrated in FIG. 4, to which a call switch is requested, and sends the call connection message to the third user device 320. In step 519, a call connection is established between the first user device 100 and the third user device 320.

Figure 5:
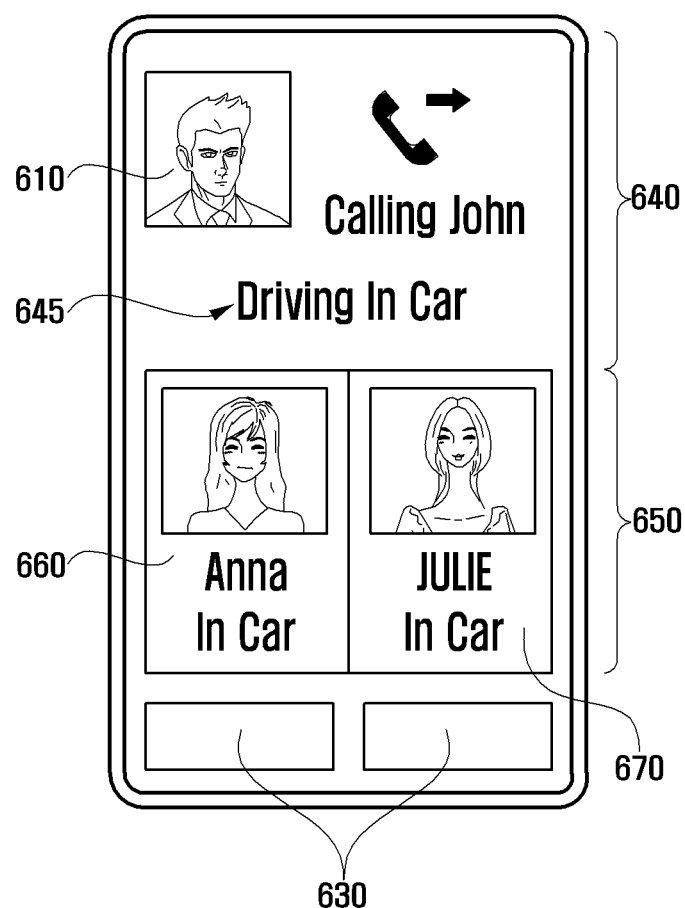
FIGS. 5 and 6 are illustrations of a user interface supported by a user device in accordance with an embodiment of the present invention.
Figure 6:
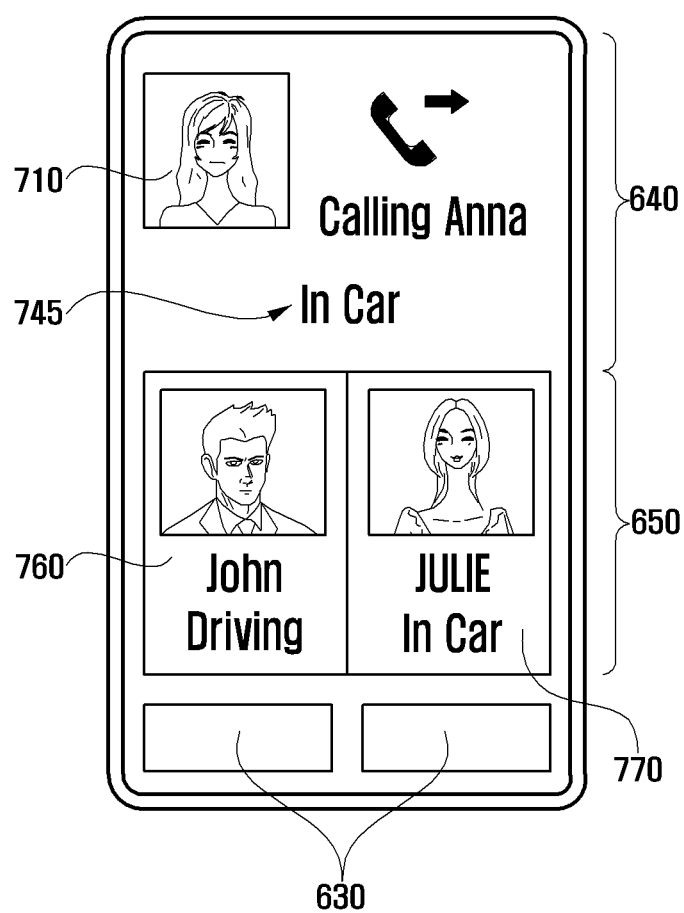

FIGS. 5 and 6 illustrate user interfaces supported by a user device in accordance with an embodiment of the present invention. Specifically, FIGS. 5 and 6 illustrate an interface provided by a call transmitting device indicating a user status of a call receiving device and information about fellow passengers who permit forwarding, based on forwarding information received from the call receiving device. More specifically, FIG. 5 illustrates an interface where a call recipient is a driver, and FIG. 6 illustrates an interface where a call recipient is a fellow passenger.

Referring to FIGS. 5 and 6, a user interface is divided into a first region 640 that indicates information about a call recipient, i.e., as a call recipient information region, and a second region 650 that indicates information about other users (e.g., fellow passengers in the same vehicle), i.e., a fellow passenger information region.

The call recipient information region 640 provides an image corresponding to device information included in forwarding information, i.e., information 610 and 710 (such as a user name, photograph, a phone number, etc.) about a call recipient, and information 645 and 745 (in the form of text or image) indicating a current status of a call recipient corresponding to status information included in the forwarding information.

If "John" is a call recipient and a driver as illustrated in FIG. 5, the call recipient information region 640 displays information 610 about "John" and information 645, such as "Driving In Car", indicating that "John" is driving. If "Anna" is a call recipient and a fellow passenger, as illustrated in FIG. 6, the call recipient information region 640 displays information 710 about "Anna" and information 745, such as "In Car", indicating that "Anna" is in a vehicle but not a driver.

The fellow passenger information region 650 may provide an image corresponding to device information in forwarding information, information (such as a user name or a phone number) about a fellow passenger, and information (in the form of text or image) indicating a current status of a fellow passenger corresponding to status information in forwarding information.

If "John" is a call recipient and a driver and "Anna" and "Julie" are fellow passengers, as illustrated in FIG. 5, the fellow passenger information region 650 displays, information about "Anna" and "In Car" indicating that "Anna" is in the same vehicle in area 660, and displays information about "Julie" and "In Car" indicating that "Julie" is in the same vehicle in area 670.

If "Anna" is a call recipient and not a driver, "John" is a driver, and "Julie" is a fellow passenger, as illustrated in FIG. 6, the fellow passenger information region 650 displays information about "John" and "Driving" indicating that "John" is driving in area 760, and displays information about "Julie" and "In Car" indicating that "Julie" is in the same vehicle in area 770.

This user interface may further and selectively include function items 630 related to a call function. For example, the function items 630 execute a change to a speaker phone mode, an item for a call stop, etc.

Although FIGS. 5 and 6 illustrate a driver with two fellow passengers, the present invention is applicable to any number of passengers, i.e., no passengers, a single passenger, and three or more fellow passengers. If there is no fellow passenger, the fellow passenger information region 650 may be left blank or replaced by other items or images.

If there are three or more fellow passengers, the fellow passenger information region 650 may be extended downwardly for suitable arrangement of information about fellow passengers. Additionally, in this case, the fellow passenger information region 650 may be in list form, instead of a block form as illustrated in FIGS. 5 and 6.

Figure 7:
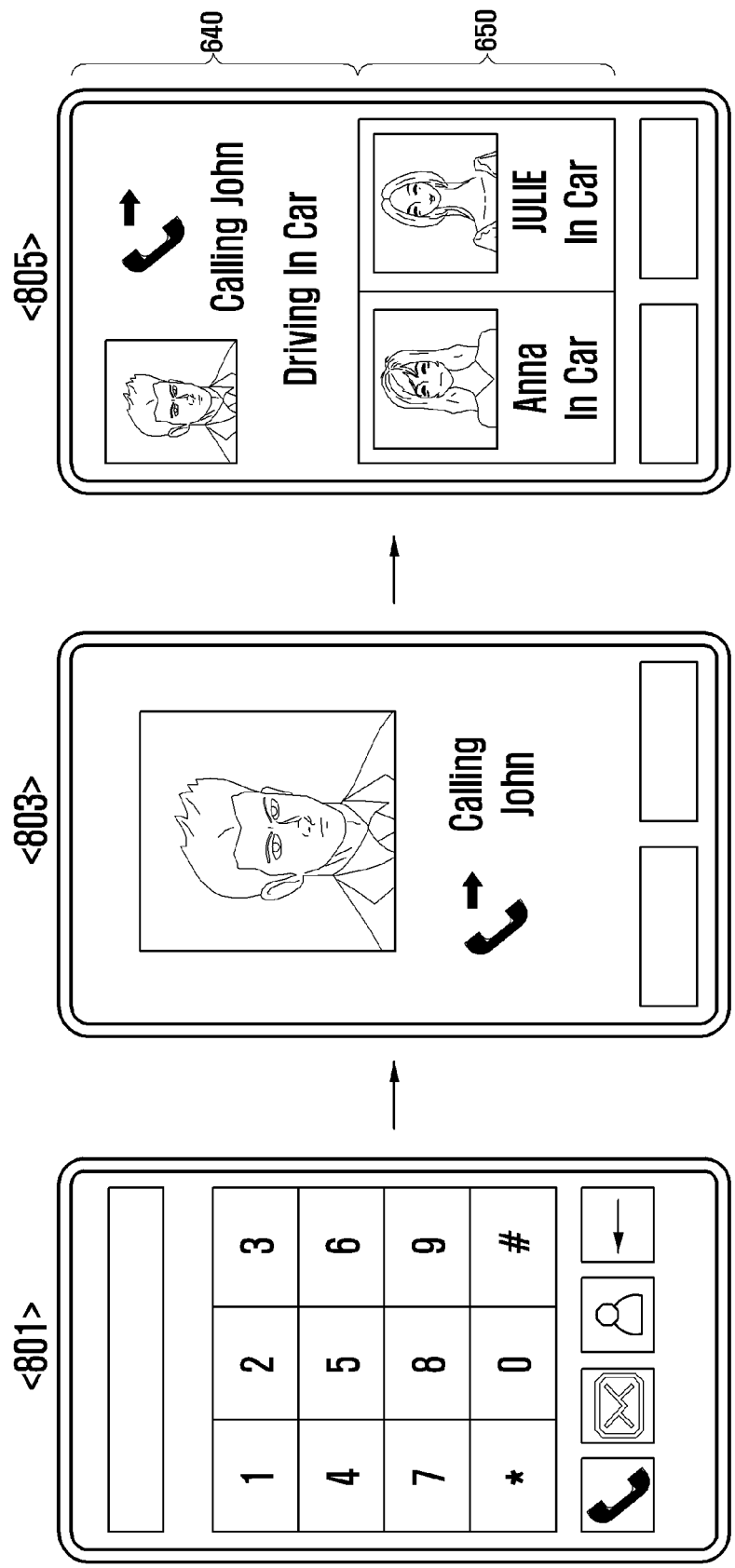
FIGS. 7 and 8 are illustrations of screens displayed by a user device during a call procedure in accordance with an embodiment of the present invention.
Figure 8:
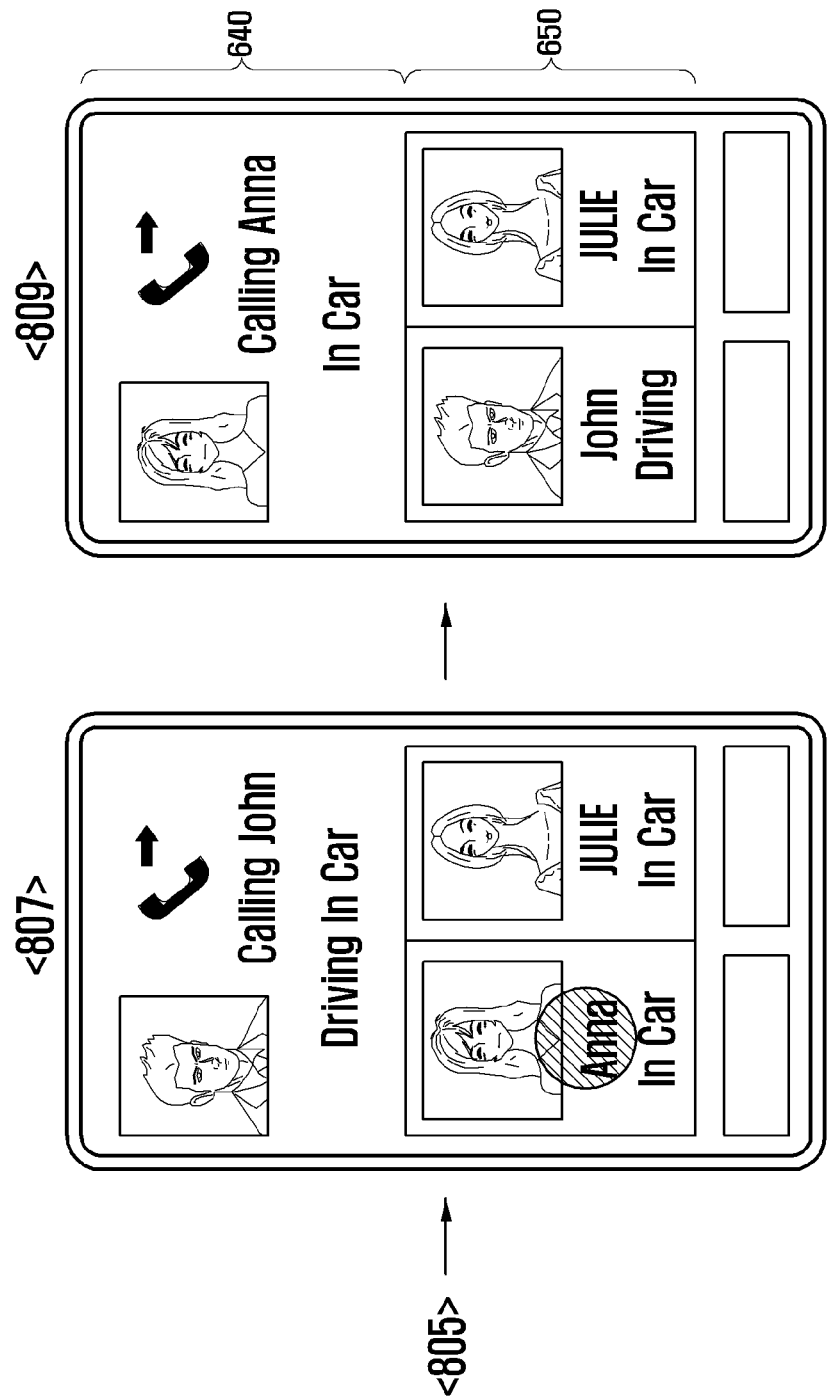

FIGS. 7 and 8 illustrate screens of a user device during a call function in accordance with an embodiment of the present invention. Specifically, FIGS. 7 and 8 illustrate a series of screens provided when a call transmission is initially performed, when a call response message including forwarding information is received from the call recipient, and when a call transmission is performed through a call switch.

Referring to FIGS. 7 and 8, screen 801 is displayed in response to a user request for executing a call function. Using a user interface of the screen 801, the user may enter a recipient's information (e.g., a phone number) and select a call button. For example, in FIG. 7, the user to call to "John".

In screen 803, the user device performs a call transmission function to "John", and displays related information about John. For example, in the screen 803, the related information is a user image of John.

When the user device receives a call response message including forwarding information from a user device of "John", the user device displays screen 805, which is generated using the received forwarding information. For example, as discussed above, the device provides the call recipient information region 640 with status information "Driving In Car" indicating that "John" is driving, and provides the fellow passenger information region 650 with status information "In Car" indicating that "Anna" and "Julie" are in the same vehicle.

Using the user interface of screen 805, the user may stop the call to "John" and instead try a call connection with one of the fellow passengers. For example, as indicated in screen 807, the user may select "Anna" who is one of fellow passengers from the fellow passenger information region 650.

Then, as indicated in screen 809, the user device performs a call transmission based on recipient information (e.g., a phone number) about "Anna". As illustrated in screen 809, the user device reconstructs a user interface to provide the call recipient information region 640 with status information about "Anna" as well as information about "Anna", i.e., "In Car", and also provides the fellow passenger information region 650 with information about "John" and "Julie" and their status information. Specifically, the user device rearranges device information and status information previously displayed in the call recipient information region 640 to the fellow passenger information region 650, and rearranges selected device information and status information previously displayed in the fellow passenger information region 650 to the call recipient information region 640. This reconstruction of a user interface by a call switch may be made based on the forwarding information previously received and temporarily (or permanently) stored.

Figure 9:
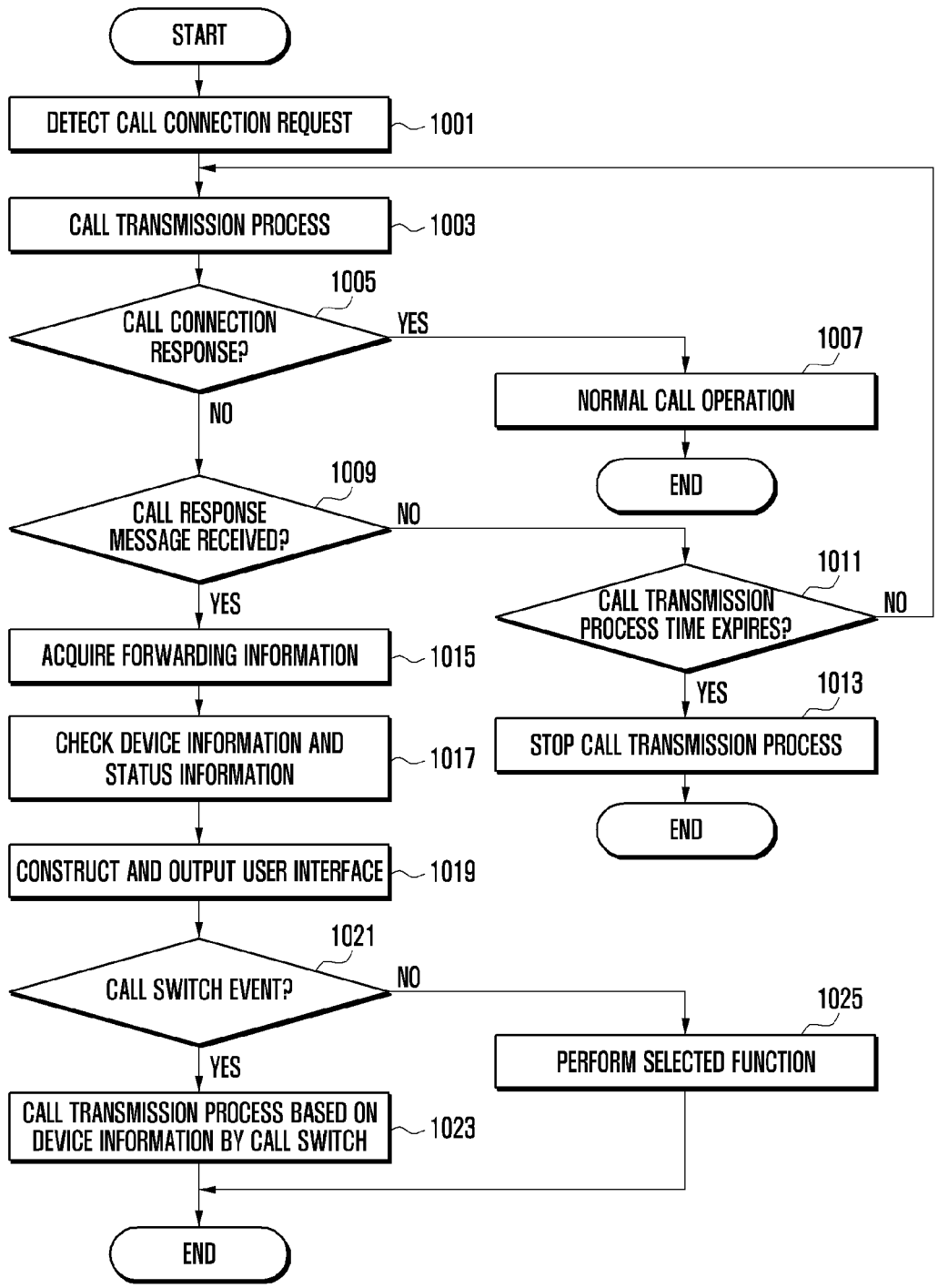
FIG. 9 is a flow diagram illustrating a call procedure by a call sender user device in accordance with an embodiment of the present invention.

FIG. 9 is a flow diagram illustrating a call procedure by a call sender user device in accordance with an embodiment of the present invention.

Referring to FIG. 9, in step 1001, the user device detects a request for a call connection and, in response thereto, initiates a call transmission process in step 1003. Specifically, the user device generates a call connection message and transmits the call connection message to a call recipient device.

In step 1005, the user device checks whether a call connection response is received. Specifically, when a response message is received from the call recipient device in response to the call connection request, the user device determines whether the received response message is a call connection response message for a normal call connection or is a call response message in the safety mode, e.g., based on information included in a header field of the response message.

When a call connection response is received from a user device of a call target in step 1005, the user device performs a normal call operation in step 1007. If there is no call connection response received, the user device checks whether a call response message is received in step 1009.

Additionally, although FIG. 9 separately depicts "to determine whether a call connection response is received" and "to determine whether a call response message is received" for convenience of description in steps 1005 and 1009, these steps may be performed in a single step.

If no call response message is received, the user device determines whether a call transmission process time has expired in step 1011. If call transmission process time has not expired, the procedure returns to step 1003.

When the call response message is received in step 1009, the user device acquires forwarding information from the received call response message in step 1015 and checks device information and status information through the forwarding information in step 1017. Specifically, the user device parses the call response message, extracts the forwarding information from a data field, and recognizes the device information and the status information from the extracted forwarding information.

In step 1019, user device outputs a user interface based on the device information and the status information, e.g., as illustrated in FIG. 7.

In step 1021, the user device determines whether a call switch event is received. For example, as illustrated on screen 807 in FIG. 8, the user device checks whether a user selects a fellow passenger from the fellow passenger information region 650.

When there is a call switch event, the user device initiates a call transmission process to a fellow passenger selected through the call switch event in step 1023.

If there is no call switch event, the user device performs another function in step 1025. For example, when there is no call switch event, the user device waits for a given time and then stops the call transmission. Here, the control unit 150 may temporarily or permanently store the acquired forwarding information in the memory unit 140. Also, in response to user's request for the stored forwarding information, the memory unit 150 may construct and provide a user interface, as discussed above, based on device information and status information in the forwarding information.

Although not illustrated in FIG. 9, the user device may stop a current call transmission process when outputting a user interface in response to reception of a call response message or when detecting a call switch event.

Figure 10:
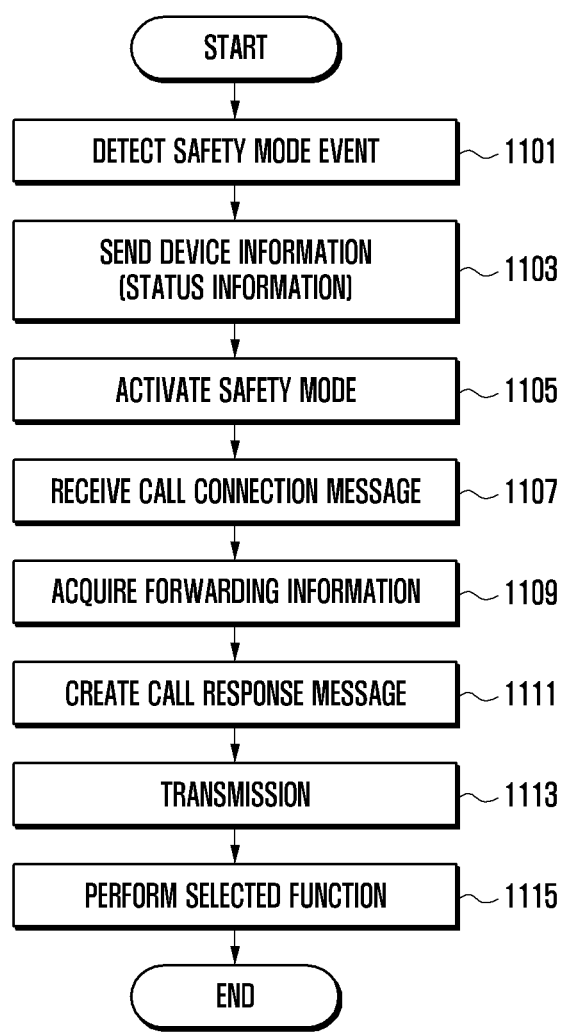
FIG. 10 is a flow diagram illustrating a call procedure by a call recipient user device in accordance with an embodiment of the present invention.

FIG. 10 is a flow diagram illustrating a call procedure by a call recipient user device in accordance with an embodiment of the present invention.

Referring to FIG. 10, the user device detects an event for executing a safety mode in step 1101. For example, when the user device enters the vehicle network 300 and then detects the vehicle management system 400, the user device connects with the vehicle management system 400 through an authentication process. When connected with the vehicle management system 400, the user device determines that an event for executing the safety mode occurs. Alternatively, when there is a request for executing the safety mode from the user, the user device determines that an event for executing the safety mode occurs.

In step 1103, the user device provides device information about the user device to the vehicle management system 400 and in step 1105, activates the safety mode. Alternatively, the order of the steps 1103 and 1105 may be reversed.

In step 1107, the user device receives a call connection message from a calling user device. In step 1109, the user device omits a normal call process by recognizing the safety mode and acquires forwarding information from the vehicle management system 400. For example, when receiving the call connection message, the user device omits a normal output (e.g., vibration, ringtone, display, etc.) for informing a user of a call reception and instead requests the vehicle management system 400 to send forwarding information. Thereafter, the user device receives the forwarding information from the vehicle management system 400.

After acquiring the forwarding information from the vehicle management system 400, the user device generates a call response message using the forwarding information in step 1111. For example, the user device inserts an identifier into a header field and inserts the forwarding information into a data field. The identifier indicates that the call response message is not for a call connection, but is for call forwarding in the safety mode.

In step 1113, the user device transmits the call response message to the calling user device. After transmitting the call response message, the user device performs a function predetermined or selected by the user in step 1115. For example, when transmitting the call response message, the user device cancels a call connection request by stopping a routine in connection with a call receiving process. This routine stop may be made automatically according to a predefined process, made manually by user's selection, or made when call transmission process time expires.

Although FIG. 10 illustrates a process in which the called user device belongs to a driver, in case of the called user device belonging to fellow passengers, the user device may perform a normal output (e.g., vibration, ringtone, display, etc.) in response to the call connection message and then, depending on user's selection, make a call connection by accepting a call connection or acquire forwarding information in the safety mode.

Although the above-described embodiments are related to a call recipient being in a vehicle, these embodiments of the present invention are not limited to this situation, are also applicable to other environments where a call recipient is in an area with other potential recipients, e.g., during a business presentation wherein the second user device belongs to a presenter who is talking, and the third and fourth user devices belong to viewers of the presentation.

The present invention is described herein with reference to flowcharts of user interfaces, methods, and computer program products according to different embodiments of the present invention. It will be understood that each block of the flowcharts, and combinations of blocks in the flowcharts, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, implement the functions specified in the flowcharts. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowcharts. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowcharts.

According to the above method and apparatus, detailed information (e.g., current status information about the recipient and device information about fellow passengers) related to the call recipient may be offered to the call sender. This may allow both the call sender and the call recipient to safely use a call service. Also, when the call recipient fails to receive a call, the above method and apparatus may intuitively offer information for a call switch to neighboring users (e.g., fellow passengers) who exist in the same space (e.g., a vehicle).

According to the above-described methods and apparatuses, when the call recipient is faced with a difficulty in receiving a call due to driving, the call sender may receive a guide to forward a call to other users in the same vehicle. Also, the above-described methods and apparatuses allow a grouping of users in the same space and thus give convenience to the call sender in making a call with such a user group.

Namely, the above-described methods and apparatuses provide more call options to the call sender by offering information about other users, instead of the call recipient, together with status information about the call recipient who is not in a good situation for receiving a call, and may be realized in a variety of environments (e.g., vehicle, home, office, hospital, factory, etc.) and also give optimal environments for a call connection to the call sender. Further, by allowing the call sender to intuitively recognize the status of call receiver, this invention may improve user convenience and enhance a safety in a call reception.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for identifying information about a call recipient by a calling user device, the method comprising:
    initiating, by the calling user device, a telephone call transmission to a call recipient device;
    receiving, by the calling user device, device information about another device connected with the call recipient device according to short-distance wireless communication and status information about the call recipient, corresponding to the telephone call transmission, wherein the status information comprises information indicating whether the call recipient is driving; and
    displaying, by the calling user device, a user interface using the device information about the other device connected with the call recipient device according to the short-distance wireless communication and the status information about the call recipient,
    wherein the user interface is divided into a plurality of information regions that are configured to provide a status of the other device and the call recipient.

2. The method of claim 1, further comprising transmitting a new telephone call transmission to the other device selected from the received device information about the other device connected with the call recipient device according to the short-distance wireless communication.

3. The method of claim 1, wherein displaying the user interface comprises:
    displaying device information and the status information about the call recipient in a first information region of the user interface; and
    displaying the device information and status information about the other device connected with the call recipient device in a second information region of the user interface.

4. The method of claim 3, further comprising:
    receiving a call switch command to call the other device connected with the call recipient based on the device information and the status information about the other device connected with the call recipient displayed in the second information region of the user interface; and
    initiating a new telephone call transmission to the other device connected with the call recipient, based on the call switch command.

5. The method of claim 4, further comprising reconstructing the first and second information regions of the user interface, based on the call switch event.

6. The method of claim 5, wherein the first and second information regions of the user interface comprises:
    moving the device information and the status information in the first information region to the second information region; and
    moving the device information and the status information about the other device connected with the call recipient in the second information region to the first information region.

7. The method of claim 6, further comprising:
    stopping the telephone call transmission to the call recipient device, when the user interface is output or when the call switch command is received.

8. A method for providing, by a call recipient device, status information about a call recipient and device information about another device connected with the call recipient device according to short-distance wireless communication, the method comprising:
    receiving a telephone call transmission from a calling user device;
    acquiring the device information about the other device connected with the call recipient and the status information about the call recipient, wherein the status information comprises information indicating whether the call recipient is driving;
    generating a call response message based on the device information about the other device connected with the call recipient device and the status information about the call recipient; and
    transmitting the call response message to the calling user device,
    wherein reception of the call response causes a user interface to be displayed at the calling user device, the user interface is divided into a plurality of information regions that are configured to provide a status of the other device and the call recipient.

9. The method of claim 8, further comprising:
    detecting a safety mode event; and
    activating a safety mode corresponding to the safety mode event.

10. The method of claim 9, wherein generating the call response message comprises inserting an identifier into a header field and inserting forwarding information into a data field,
    wherein the identifier indicates that the call response message is for call forwarding in the safety mode.

11. The method of claim 8, wherein generating the call response message comprises:
    identifying device information for users having a relationship to the calling user device from the acquired device information about the other device connected with the call recipient device and the status information about the call recipient; and
    inserting the device information for the users having the relationship to the calling user device into the call response message, while omitting device information for users having no relationship to the calling user device from the acquired device information about the other device connected with the call recipient device and the status information about the call recipient.

12. A system for identifying information about a call recipient, the system comprising:
   a calling user device that transmits a telephone call request;
   a call recipient device that receives the telephone call request from the calling user device, and transmits a call response, based on status information about the call recipient and device information about a fellow device connected with the call recipient device, to the calling user device in response to the telephone call request, wherein the status information comprises information indicating whether the call recipient is driving;
   the fellow device that is connected with the call recipient device according to short-distance wireless communication; and
   a vehicle management system that generates the device information about the call recipient device and the fellow device, generates status information about the call recipient device, and connects the call recipient device and the fellow device according to the short-distance wireless communication,
   wherein the calling user device receives the status information about the call recipient device and the device information about the fellow device connected with the call recipient device from the call recipient device, and displays a user interface based on the received status information about the call recipient and the device information about the fellow device connected with the call recipient device, and
   wherein the user interface is divided into a plurality of information regions that are configured to provide a status of the other device and the call recipient.

13. The system of claim 12, wherein the user interface displays the device information and the status information about the call recipient device in a first information region, and displays the device information and status information related to the fellow device in a second information region.

14. The system of claim 13, wherein the calling user device transmits a new telephone call request to the fellow device in response to a call switch event selected in the second information region, and reconstructs the user interface by moving the device information and the status information about the call recipient device in the first information region to the second information region and by moving the device information and the status information related to the fellow device in the second information region to the first information region.

15. The system of claim 12, wherein each of the calling user device and the call recipient device includes:
   a communication unit;
   a display unit; and
   a control unit that controls a call transmitting function and a call receiving function.

16. The system of claim 15, wherein the control unit of the calling user device generates a call connection message, controls the communication unit to transmit the call connection message to the call recipient device, controls the display unit to display the user interface when the call response message is received from the call recipient device, and controls the communication unit to perform a telephone call transmission process based on information about a call switch target.

17. The system of claim 15, wherein the control unit of the call recipient device controls the communication unit to transmit the device information about the call recipient device and the fellow device to the vehicle management system when connected to the vehicle management system, acquires the device information about the call recipient device and the fellow device from the vehicle management system, generates the call response message including the device information about the call recipient device and the fellow device, and controls the communication unit to transmit the call response message to the calling user device.

* * * * *